US008223354B2

(12) United States Patent
Itagaki (10) Patent No.: US 8,223,354 B2
(45) Date of Patent: Jul. 17, 2012

(54) PRINTING APPARATUS CAPABLE OF PERFORMING CONFIDENTIAL PRINTING AND PRINTING METHOD FOR USE THEREIN (75) Inventor: Kazuhiro Itagaki, Toyonaka (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1417 days.

(21) Appl. No.: 11/436,575

(22) Filed: May 19, 2006

(65) Prior Publication Data

US 2007/0013938 A1    Jan. 18, 2007

(30) Foreign Application Priority Data

Jul. 12, 2005  (JP) ................. 2005-202447

(51) Int. Cl.
*G06K 15/00* (2006.01)
*G06F 3/12* (2006.01)
*G06F 21/00* (2006.01)
*H04N 1/46* (2006.01)
*H04L 29/06* (2006.01)
*H04L 9/32* (2006.01)

(52) U.S. Cl. ...... 358/1.14; 358/1.15; 358/505; 358/508; 713/152; 713/166; 713/168; 713/184

(58) Field of Classification Search ............ 358/1.13, 358/1.14, 505, 402, 508, 539, 405, 435, 463, 358/474, 476; 713/184, 152, 168, 166; 380/201, 380/202, 203, 216, 239, 241
See application file for complete search history.

(56) References Cited

U.S. PATENT DOCUMENTS

| 6,151,464 | A | 11/2000 | Nakamura et al. | |
|---|---|---|---|---|
| 7,298,505 | B2 | 11/2007 | Ueda | |
| 2001/0012122 | A1* | 8/2001 | Ueda | 358/1.15 |
| 2004/0125402 | A1* | 7/2004 | Kanai et al. | 358/1.15 |
| 2005/0264840 | A1* | 12/2005 | Niitsuma | 358/1.14 |
| 2006/0230286 | A1* | 10/2006 | Kitada | 713/186 |

FOREIGN PATENT DOCUMENTS

| JP | 11-334158 A | 12/1999 |
|---|---|---|
| JP | 2002-177212 A | 6/2000 |
| JP | 2001-148753 | 5/2001 |
| JP | 2001-216123 A | 8/2001 |

OTHER PUBLICATIONS

Japanese Office Action dated Nov. 5, 2007 with English translation.

\* cited by examiner

*Primary Examiner* — Benny Q Tieu
*Assistant Examiner* — Ngon Nguyen
(74) *Attorney, Agent, or Firm* — Buchanan Ingersoll & Rooney PC (57) ABSTRACT

An printing apparatus capable of maintaining confidentiality of a printed matter more reliably. Where a confidential print command is received, when user identification information for a user who issued the confidential print command is read from a recording medium such as an IC card by a reader, the printing apparatus puts the execution of the print processing pertaining to the confidential print command on hold if print processing based on a command issued by a user other than the user who issued the confidential print command via operation of an operation unit is being executed, and it begins the execution of the print processing pertaining to the confidential print command if print processing based on a command issued by a user other than the user who issued said confidential print command via operation of the operation unit is not being executed.

15 Claims, 7 Drawing Sheets

| JOB ID | DATE AND TIME OF REGISTRATION | JOB TYPE | USER ID | PROCESSING PARAMETERS | | | | HOLD FLAG |
|---|---|---|---|---|---|---|---|---|
| | | | | CONFIDENTIAL PRINTING | DATE AND TIME OF OUTPUT COMMENCEMENT | PAPER SIZE | ... | |
| J0609-123 | 2005/6/09 22:15:50 | COPY | 002 | ON | 2005/6/10 08:40:00 | A4 | ... | O — DT2 |
| J0610-001 | 2005/6/10 08:37:40 | PRINT | 001 | ON | — | B4 | ... | O — DT2 |
| J0610-002 | 2005/6/10 08:40:00 | FAX TRANSMISSION | 004 | — | — | — | ... | — DT2 |
| J0610-003 | 2005/6/10 08:43:15 | COPY | 003 | — | — | A4 | ... | — DT2 |
| ... | ... | ... | ... | ... | ... | ... | ... | ... |

PRINTING APPARATUS CAPABLE OF PERFORMING CONFIDENTIAL PRINTING AND PRINTING METHOD FOR USE THEREIN

This application is based on Japanese Patent Application No. 2005-202447 filed in Japan on Jul. 12, 2005, the entire content of which is hereby incorporated by reference.

BACKGROUND OF THE INVENTION

1. Field of the Invention

The present invention relates to a printing apparatus or the like shared by a plurality of users.

2. Description of the Related Art

Printing apparatuses having copying and network printing functions have recently come to include additional functions, including those of a scanner, fax and document server, and are now called MFPs (Multi-Function Peripherals). The increasing number of different functions possessed by these printing apparatuses has led to their being shared by a number of users.

Incidentally, a user may want to use such a printing apparatus to print a document that includes confidential information that he does not want others to see.

However, if the terminal device operated by the user and the printing apparatus are located apart from each other, there is a risk that someone else may see the printed matter during the period between the user's issuance of the print command and the user's arrival at the printing apparatus installation location to retrieve the printed matter. There is also a risk that somebody else might remove the printed matter by mistake.

Accordingly, it is possible to apply the network scanner control method disclosed in Japanese Laid-Open Patent Application 2001-148753 to a printing apparatus. The network scanner disclosed in this patent document includes a function to receive over network reservations that include additional information, as well as an IC card reader that is used to authenticate reservation registrants. When a registrant is authenticated, the scanner changes the operations of the read processing in accordance with the additional information included in the reservation. In other words, the network scanner changes the reservation-related processing when the person who arrives at the place of installation has been authenticated as the registrant of the pertinent reservation.

If this control method is applied to print processing performed by a printing apparatus, print processing of a print command can be executed only after the user who issued such print command has arrived at the printing apparatus.

However, when it comes to such a printing apparatus as an MFP, a user may issue a print command using the operation panel on the printing apparatus or over a network via a terminal device. Alternatively, a user can adjust the date and time of execution of print processing using a timer function. In other words, because print processing can be executed sequentially based on print commands issued by a plurality of users, even if a control method such as the one disclosed in Japanese Laid-Open Patent Application 2001-148753 is applied in a printing apparatus such as an MFP, it is still possible for someone else to see the printed matter or remove the printed matter by mistake.

OBJECT AND SUMMARY

An object of the present invention is to provide an improved printing apparatus and printing method that resolve the various problems identified above.

Another object of the present invention is to, in comparison with the conventional art, more reliably maintain the confidentiality of printed matter that is generated in accordance with a print command from persons other than the user who issued the command.

These and other objects are attained by providing, for example, a printing apparatus that includes: a printing unit that prints an image; an operation unit that enables user operation; a communication unit that enables communication with a terminal device; a receiving unit that receives a command to execute print processing issued by a user to said printing apparatus by operating said operation unit or said terminal device; an obtaining unit that obtains via a reading device user identification information based on which a user is identified, wherein said reading device is connected to the printing apparatus and reads the user identification information from a portable recording medium; and a controller that, where said receiving unit receives a confidential print command comprising a command for execution of print processing in a manner that will keep a printed matter confidential from other persons, when user identification information for the user who issued said confidential print command is read by said reading device, if print processing based on a command issued by a user other than the user who issued said confidential print command via the operation of said operation unit is being executed by said printing unit, controls said printing unit such that the execution of the print processing pertaining to said confidential print command is put on hold, and if print processing based on a command issued by a user other than the user who issued said confidential print command via the operation of said operation unit is not being executed by said printing unit, controls said printing unit such that the execution of the print processing pertaining to said confidential print command is begun.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
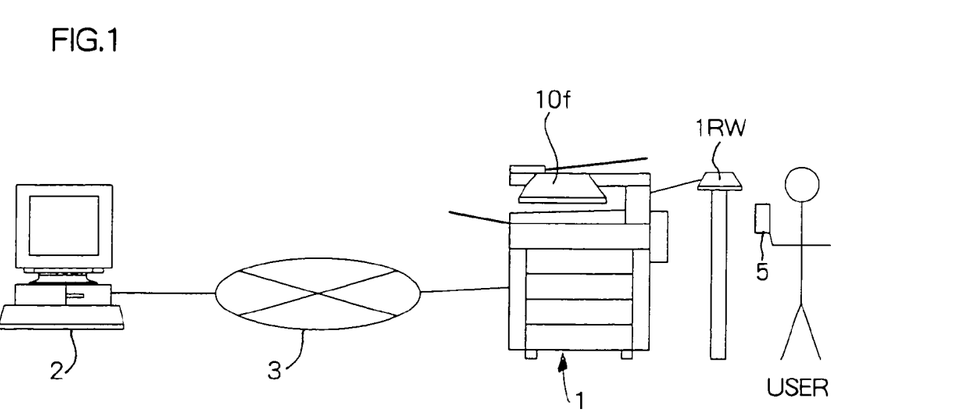
FIG. 1 is a drawing showing an example of the entire configuration of a system having an image forming apparatus.
Figure 2:
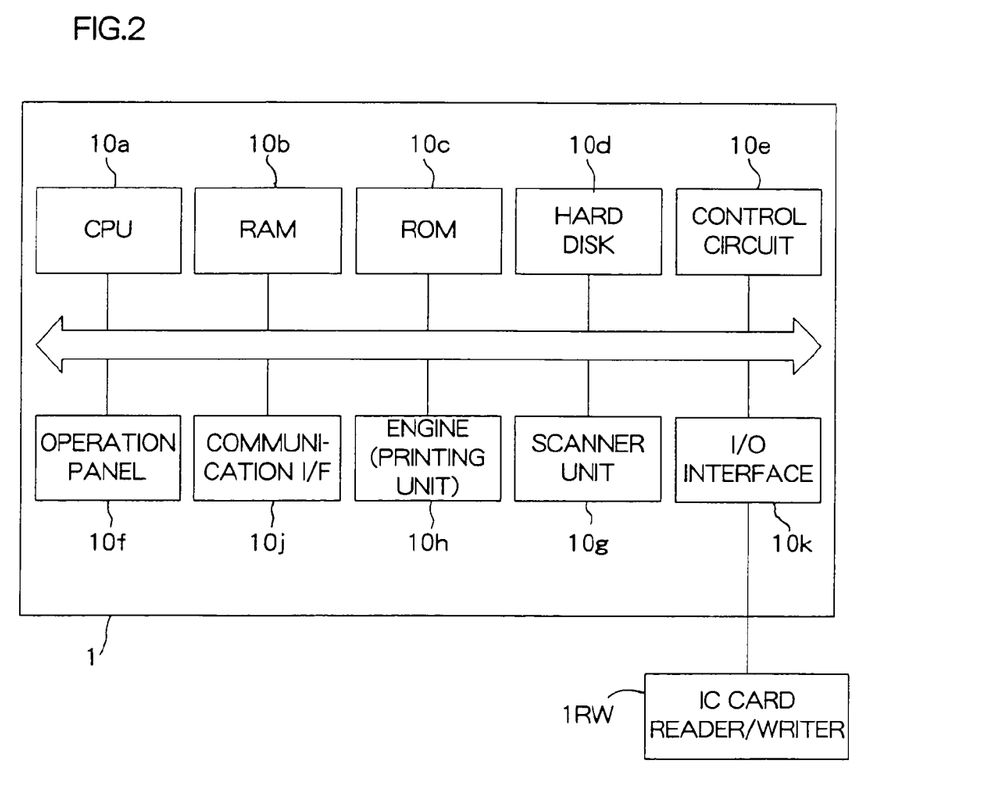
FIG. 2 is a drawing showing an example of the hardware configuration of the image forming apparatus.
Figure 3:
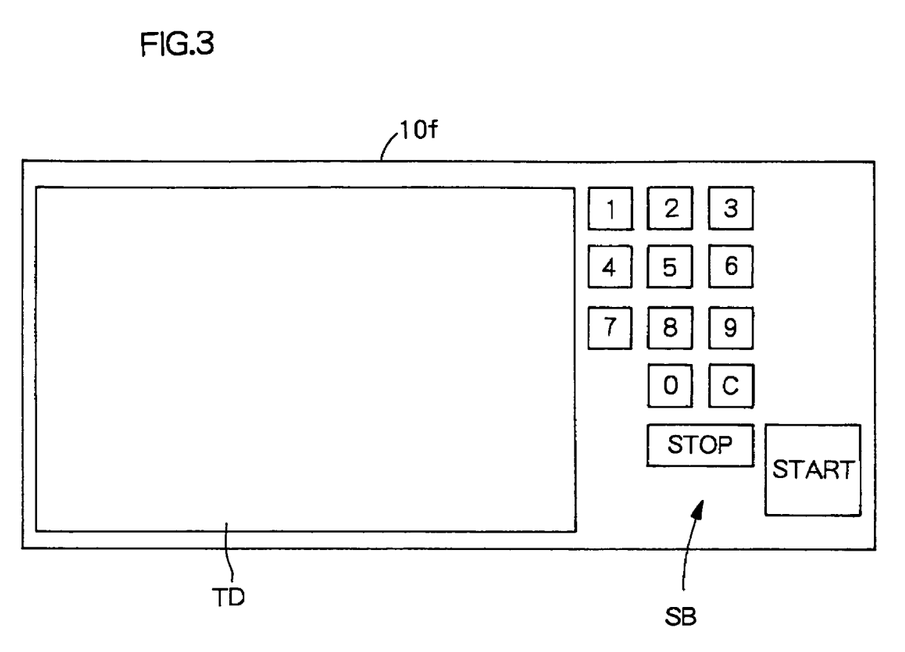
FIG. 3 is a drawing showing an example of an operation panel.
Figure 4:
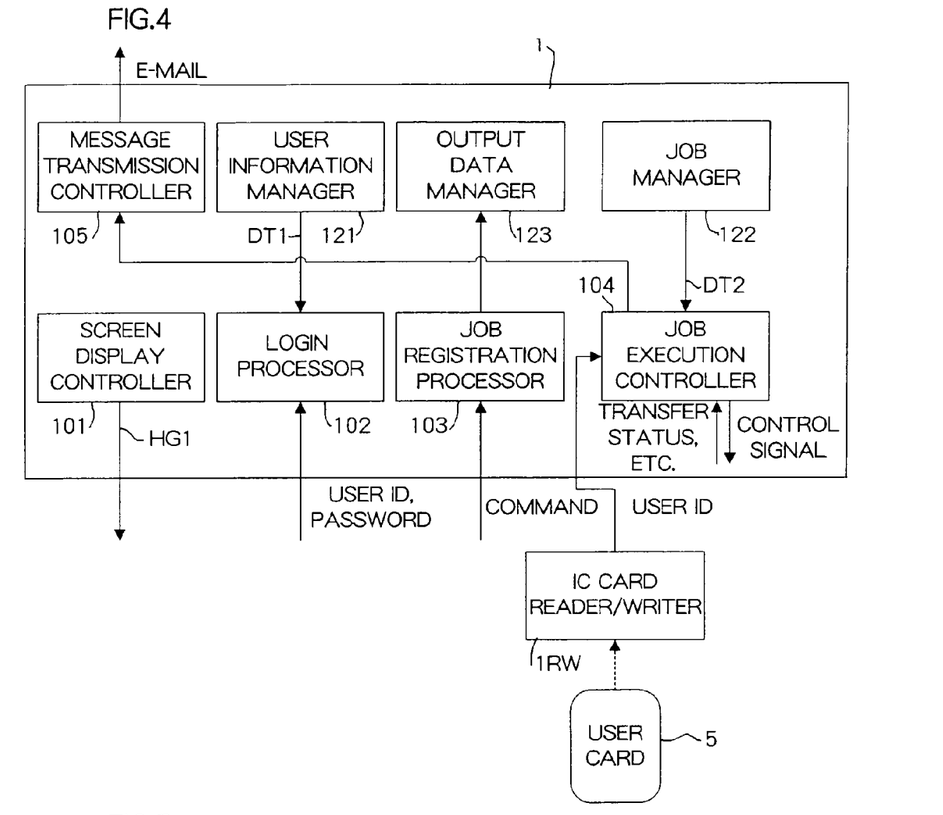
FIG. 4 is a drawing showing an example of the functional configuration of the image forming apparatus.

FIG. 1 is a drawing showing an example of the entire configuration of a system having an image forming apparatus 1. FIG. 2 is a drawing showing an example of the hardware configuration of the image forming apparatus 1. FIG. 3 is a drawing showing an example of an operation panel 10f. FIG. 4 is a drawing showing an example of the functional configuration of the image forming apparatus 1.

The image forming apparatus 1 pertaining to the present invention is connected to one or more terminal devices 2 over a communication circuit 3 as shown in FIG. 1. The Internet, an intranet, public circuits or dedicated lines are used for the communication circuit 3.

An application program and a driver that serve the image forming apparatus 1 are installed in each terminal device 2. The terminal device 2 may comprise a personal computer or workstation.

The image forming apparatus 1 is a processing apparatus that possesses various functions, including the functions of a copying machine, scanner, fax, network printer and document server. It is sometimes called an MFP. The 'network printer' function is a function by which image data is received from a terminal device 2 and an image is printed onto paper. It may be called a 'network printer function' or 'PC print function'. The 'document server' function is a function whereby a storage area termed a 'box' or 'personal box' and equivalent to a folder or directory in a personal computer is provided to each user to enable the user to save document data such as an image file in the storage area. This function is sometimes referred to as a 'box function'.

The image forming apparatus 1 is installed in an office such as a government office or business office, a public facility such as a school or library, a store such as a convenience store, or various other places, and can be used by a plurality of users.

Each user who is authorized to use the image forming apparatus 1 is supplied with a user account. A user account has a unique user ID such that the user to which the user account is assigned can be differentiated from other users. Each user is also issued a user card 5 on which the user ID for the relevant user account is recorded. In this embodiment, an example in which an IC card is used as the user card 5 is provided in the description.

As shown in FIG. 2, the image forming apparatus 1 comprises a CPU 10a, a RAM 10b, a ROM 10c, a hard disk 10d, a control circuit 10e, an operation panel 10f, a scanner unit 10g, a printing unit 10h, a communication interface 10j, an I/O interface 10k and other components.

The control circuit 10e is a circuit to control such devices as the hard disk 10d, scanner unit 10g, printing unit 10h, communication interface 10j, operation panel 10f and I/O interface 10k.

The scanner unit 10g is a device that optically reads images such as photos, letters/characters, drawings and graphs and charts present on an original document and generates image data. The printing unit 10h prints images onto paper based on the image data obtained by the scanner unit 10g or image data sent from a terminal device 2. The communication interface 10j comprises an NIC (Network Interface Card) or modem and enables communication with other devices.

The I/O interface 10k is an interface such as RS-232C, USB, IEEE1394 or SCSI. An IC card reader/writer 1RW is connected to the image forming apparatus 1 via this I/O interface 10k.

The operation panel 10f comprises an operation unit SB and a display unit TD, as shown in FIG. 3. A numerical keypad or the like is used for the operation unit SB and a liquid crystal display or the like is used for the display unit TD. By operating the operation unit SB, the user can issue to the image forming apparatus 1 command to start or stop execution of processing, or designate processing parameter values such as the data destination, printing parameter values and the image file format, as well as various other parameter values. Displayed on the display unit TD are a screen by which to send a message or instruction to the user, a screen by which the user inputs the desired type of processing and processing parameter value information, a screen that shows the results of processing executed by the image forming apparatus 1, and the like. Where a touch panel is used for the operation panel 10f, the touch panel serves as both the operation unit SB and the display unit TD. In this way, the operation panel 10f plays the role of a user interface for the user who operates the image forming apparatus 1. As described above, an application program and driver to issue commands to the image forming apparatus 1 are installed in each terminal device 2. Therefore, the user can remotely operate the image forming apparatus 1 through a terminal device 2.

Programs and data to realize the functions of a screen display controller 101, login processor 102, job registration processor 103, job execution controller 104, message transmission controller 105, user information manager 121, job manager 122 and output data manager 123 shown in FIG. 4 are stored on the hard disk 10d. These programs are read into the RAM 10b where necessary and are executed by the CPU 10a. All or part of these programs and data may be stored in the ROM 10c. Alternatively, all or part of the functions shown in FIG. 4 may be realized through a control circuit 10e.

The IC card reader/writer 1RW is a device that reads the information recorded on the user card 5 and sends it to the image forming apparatus 1. The IC card reader/writer 1RW reads information from the user card 5 by transmitting electromagnetic waves to the user card 5 and receiving back different electromagnetic waves generated by the user card 5 that received the initial electromagnetic waves. Therefore, the information can be read by the IC card reader/writer 1RW without coming into contact with the user card 5 (i.e., in a non-contact fashion).

This IC card reader/writer 1RW is located near the image forming apparatus 1, i.e., several tens of centimeters to one meter laterally away from the position of the operation panel 10f, for example. As a result, a user can have his user card 5 read by the IC card reader/writer 1RW even when another user is operating the operation panel 10f.

Alternatively, the IC card reader/writer 1RW may be disposed as part of the image forming apparatus 1. However, it should be disposed at a distance from the operation panel 10f that will ensure that the operation panel 10f and the IC card reader/writer 1RW can be used by two different users at the same time.

The operations of processes performed by the various components of the image forming apparatus 1 shown in FIG. 4, the IC card reader/writer 1RW and terminal devices 2 will now describe below.

Figure 5:
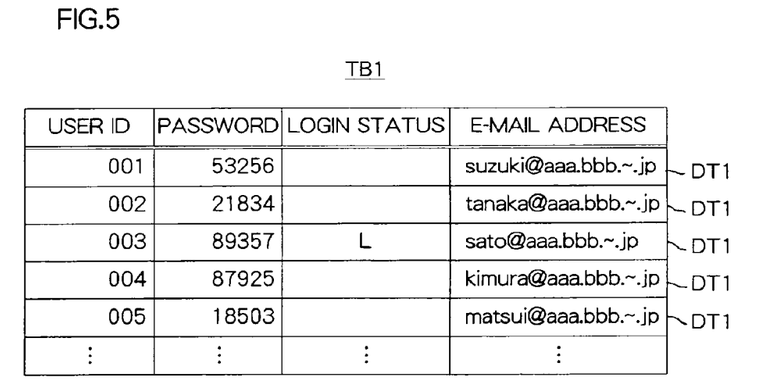
FIG. 5 is a drawing showing an example of a user information table.
Figure 6:
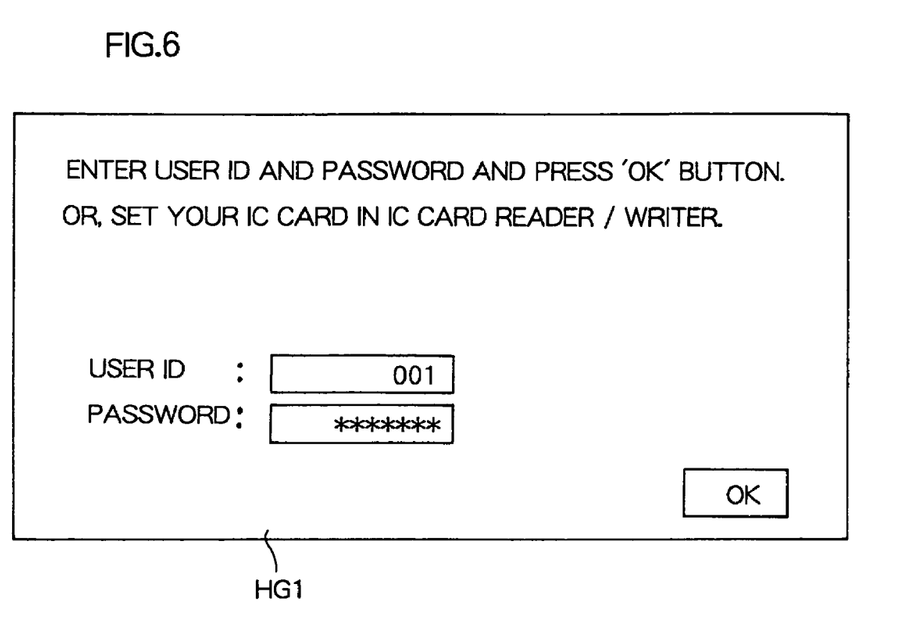
FIG. 6 is a drawing showing an example of a login screen.
Figure 7:
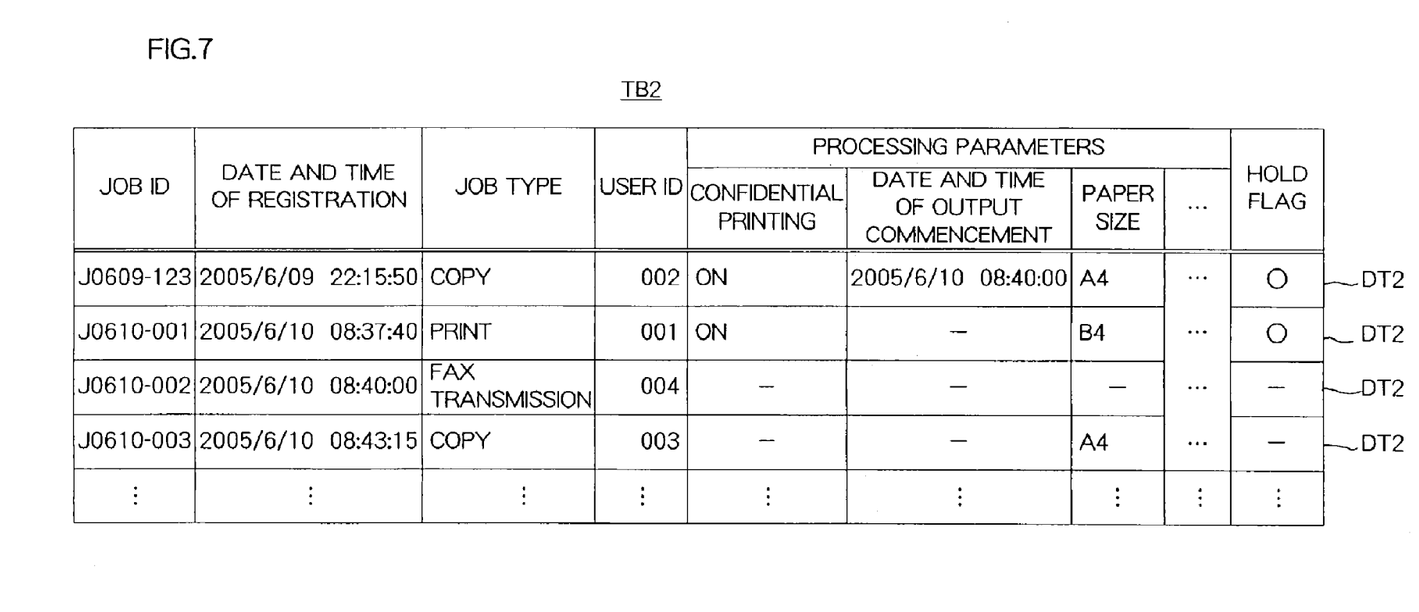
FIG. 7 is a drawing showing an example of a job information table.

FIG. 5 is a drawing showing an example of a user information table TB1. FIG. 6 is a drawing showing an example of a login screen HG1. FIG. 7 is a drawing showing an example of a job information table TB2.

The user information manager 121 shown in FIG. 4 stores and manages a user information table TB1. Stored in this user information table TB1 are, as shown in FIG. 5, user account information sets DT1 each comprising a user ID, a password and the login status information for a user authorized to use the image forming apparatus 1. One user account information set DT1 is prepared for one user.

'User ID' in a user account information set DT1 is the identification information for the user account assigned to the pertinent user. 'Password' is a keyword known to only the user and is used for user authentication during login.

'Login status' indicates whether or not the user is logged into the image forming apparatus 1. If the value 'L' is shown, that indicates that the user logged in by directly operating the operation panel 10f of the image forming apparatus 1, or logged in locally. If the value 'N' is shown, that means that the user logged into the image forming apparatus 1 remotely by operating a terminal device 2, or logged in over the network. The value for 'Login status' is updated as appropriate each time a user logs in or out of the image forming apparatus 1.

'E-mail address' indicates the e-mail address used as the contact information for the user. It is desirable for users to designate an e-mail address on their cell phone terminal or the like.

Returning to FIG. 4, the image display controller 101 performs control in order to cause the display unit TD of the operation panel 10f to display a screen corresponding to the results of processing or user operation. For example, when there is no user who directly operated the operation panel 10f to log in the image forming apparatus 1 (i.e., a locally logged-in user), it causes a login screen HG1 for the input of a user ID and a password shown in FIG. 6 to be displayed as a standby screen. When a user remotely operates the image forming apparatus 1 from a terminal device 2, the screen display controller 101 executes display processing by sending screen data to display the screen to the user's terminal device 2.

The login processor 102 carries out processing regarding login and logout to and from the image forming apparatus 1 by users. The login processing is executed based on the user ID and password input by a user via the login screen HG1 displayed on the operation panel 10f or via a terminal device 2.

In other words, the login processor 102 first searches the user information table TB1 for the user account information set DT1 corresponding to the input user ID (see FIG. 5). It then compares the input password with the password shown in the user account information set DT1 found from the search. If the passwords match, the login processor 102 recognizes the user who carried out the input as an authorized user and permits login to the image forming apparatus 1. A user who is permitted to log in can use the image forming apparatus 1 until logout. Where the user input the user ID and the like by operating the operation panel 10f, the value for 'Login status' in the user account information set DT1 for that user ID is updated after login to 'L', and where the user remotely input the user ID and other information by operating a terminal device 2, such value is updated to 'N'.

Alternatively, a user can log in locally using his user card 5. In this case, the user performs a prescribed operation on the login screen HG1 displayed on the operation panel 10f, and places his user card 5 close to the IC card reader/writer 1RW. The user ID recorded on the user card 5 is then read by the IC card reader/writer 1RW and sent to the image forming apparatus 1. If the sent user ID matches the user ID of user account information set DT1 stored in the user information table TB1, the login processor 102 recognizes the user who carried out the operation as an authorized user and permits him to log into the image forming apparatus 1.

When a logout command from a currently logged-in user is received, the login processor 102 executes processing to log out the user from the image forming apparatus 1. Specifically, the login processor 102 searches the user information table TB1 for the user account information set DT1 for the user ID of that user, and deletes the Login status' value of that user account information set DT1. It then prohibits the use of the image forming apparatus 1 by that user. As a result, the user cannot use the image forming apparatus 1 unless he is authenticated by the image forming apparatus 1 once more. The login processor 102 also executes processing to log out a logged-in user if the user does not perform any operation within a prescribed period of time.

The job manager 122 stores and manages a job information table TB2. Stored in this job information table TB2 are, as shown in FIG. 7, job information sets DT2 for jobs regarding which execution has not been completed. One job information set DT2 is prepared for each job. The job manager 122 also deletes from the job information table TB2 the job information set DT2 for jobs for which execution has been completed.

'Job ID' in a job information set DT2 comprises identification information to differentiate the job pertaining to that job information set DT 2 from other jobs. 'Date and time of registration' indicates the date and time at which the job was registered in the job information table TB2. 'User ID' indicates the user ID of the user who issued an execution command for the job.

'Job type' indicates the type of the job. For example, the job type 'Print' refers to a job to print a document based on document data sent from a terminal device 2 (a network printing or PC printing job). Such a job is referred to as a 'PC print job' herein. 'Copy' refers to a job to print an image onto paper based on image data read from an original document by the scanner unit 10g. Such a job is referred to as a 'copy job' herein. 'Scan' refers to a job to generate image data via reading the image of an original document by the scanner unit 10g. Such a job is referred to as a 'scan job' herein. 'Fax transmission' refers to a job to read the image of an original document using the scanner unit 10g and send the image data to a facsimile terminal or other MFP as fax data. Such a job is referred to as a 'fax transmission job' herein. 'Box print' refers to a job to print an image onto paper based on image data stored in a box designated by the user. Such a job is referred to as a 'box print job'herein. The user can designate image data stored in a box via the operation panel 10f or a terminal device 2.

Each 'Processing parameters' field indicates the execution parameters for a job. Among those, 'Confidential print' indicates whether or not the job for which print processing is to be performed should be executed using the confidential printing function. If this field indicates that confidential printing is 'ON', that job is executed using the confidential printing function. The 'confidential printing function' is a function to prevent the disclosure of printed matter generated via the execution of the job to any person other than the user who issued the execution command for that job. Specifically, it is a function that, when the user who issued the execution command is located near the image forming apparatus 1 and no other user is engaged in any printing operation, permits the execution of the job corresponding to the execution command and generates the printed matter. A job that requires print processing by the printing unit 10h is referred to as a 'print job' herein. In this embodiment, PC print jobs, copy jobs and box print jobs comprise print jobs.

'Date and time of output commencement' indicates the date and time scheduled for the execution of the operations of the output processing (such as print processing or fax data transmission processing) included in a job. The operations of the output processing included in that job are not executed until the indicated date and time. In other words, the date and time of output commencement refers to a timer-reserved date and time. The job information set DT2 additionally includes information regarding various processing parameters such as the paper size for the paper to be used for printing, the side or sides of the paper to be used for printing, the type of finisher to be used and the telephone number of the output destination device.

'Hold flag' is a flag indicating that a job is put on hold for a certain reason even though it is the job's turn for execution of the output processing included therein. A circle in this field indicates that a flag is raised, i.e., the job is on hold.

Returning to FIG. 4, the job registration processor 103 performs processing to generate job information set DT2 based on a job execution command from a user and register it in the job information table TB2. In other words, when a user designates a job type and processing parameter values by operating the operation panel 10f or a terminal device 2, the job registration processor 103 receives these designations as an execution command, generates job information set DT2 and registers it in the job information table TB2. It then issues a unique job ID to that job, and stores it in the 'Job ID' field for the job information set DT2 for that job. Furthermore, it stores a value indicating the date and time of registration in the 'Date and time of registration' field, the user ID for the user in the 'User ID' field, a value indicating the designated job type in the 'Job type' field, and values indicating the processing conditions in each 'Processing parameters' field.

The job registration processor 103 also causes data necessary for the execution of the job designated by the user to be stored in the output data manager 123. For example, where the job designated by the user is a PC print job, the job registration processor 103 generates print data via bitmap development or the like of the image data sent from the user's terminal device 2 and causes the output data manager 123 to store this print data in association with the job ID for that job. Where the job is a copy job, the job registration processor 103 generates print data by scanning the image of the original document placed on the platen glass using the scanner unit 10g and causes the output data manager 123 to store the print data in association with the job ID for that job. Where the job is a fax transmission job, the job registration processor 103 generates fax data by scanning the image of the original document placed on the platen glass using the scanner unit 10g and causes the output data manager 123 to store the fax data in association with the job ID for that job.

The job execution controller 104 controls the various components of the image forming apparatus 1 such that the jobs shown in the job information sets DT2 stored in the job information table TB2 are executed. For example, in the case of a PC print job or copy job, the job execution controller 104 retrieves the print data associated with the job ID for the job from the output data manager 123 and controls the printing unit 10h and the like such that print processing is executed based on this print data.

The sequence in which the jobs are executed is based on the date and time at which the job information set DT2 for each job was registered in the job information table TB2. In other words, the job execution controller 104 causes the jobs to be executed on a first-registered, first-executed basis.

However, as in the conventional art, the order of execution may be changed where appropriate depending on the operating status of the hardware resources. For example, if the job information table TB2 has a large number of job information sets DT2 for jobs that require print processing by the printing unit 10h but only a few job information sets DT2 for jobs that require fax data transmission processing by the communication interface 10j, jobs of the latter type may be executed prior to jobs of the former type. In addition, some operations included in a job may be executed depending on the operating status of the hardware resources. For example, if a copy job is received while the printing unit 10h is busy but the scanner unit 10g is idle, of the scan processing operations and print processing operations included in the copy job, only the former processing operations are first executed.

Furthermore, even if a certain job's turn for execution has arrived, where the current time has not reached the date and time of output commencement indicated in the job information set DT2 for that job, the execution of the output processing operations included in that job is put on hold, as described above. The output processing operations for that job are executed only after the date and time of output commencement. In addition, the output processing operations included in a job may be put on hold when the confidential printing function is 'ON'. The processing of jobs for which confidential printing is 'ON' will be explained in detail below using a flow chart.

The message transmission controller 105 performs processing to transmit to the e-mail address of a user e-mail that incorporates a message to be sent to such user. Transmission and receipt of e-mail can be carried out using a protocol such as SMTP (Simple Mail Transfer Protocol) or POP (Post Office Protocol), but a different method may be used. For example, a file including a message may be sent to the recipient's device as e-mail via the FTP (File Transfer Protocol). Alternatively, a message may be sent via some other unique protocol.

The execution of a job in the image forming apparatus 1 will now be explained using flow charts.

Figure 8:
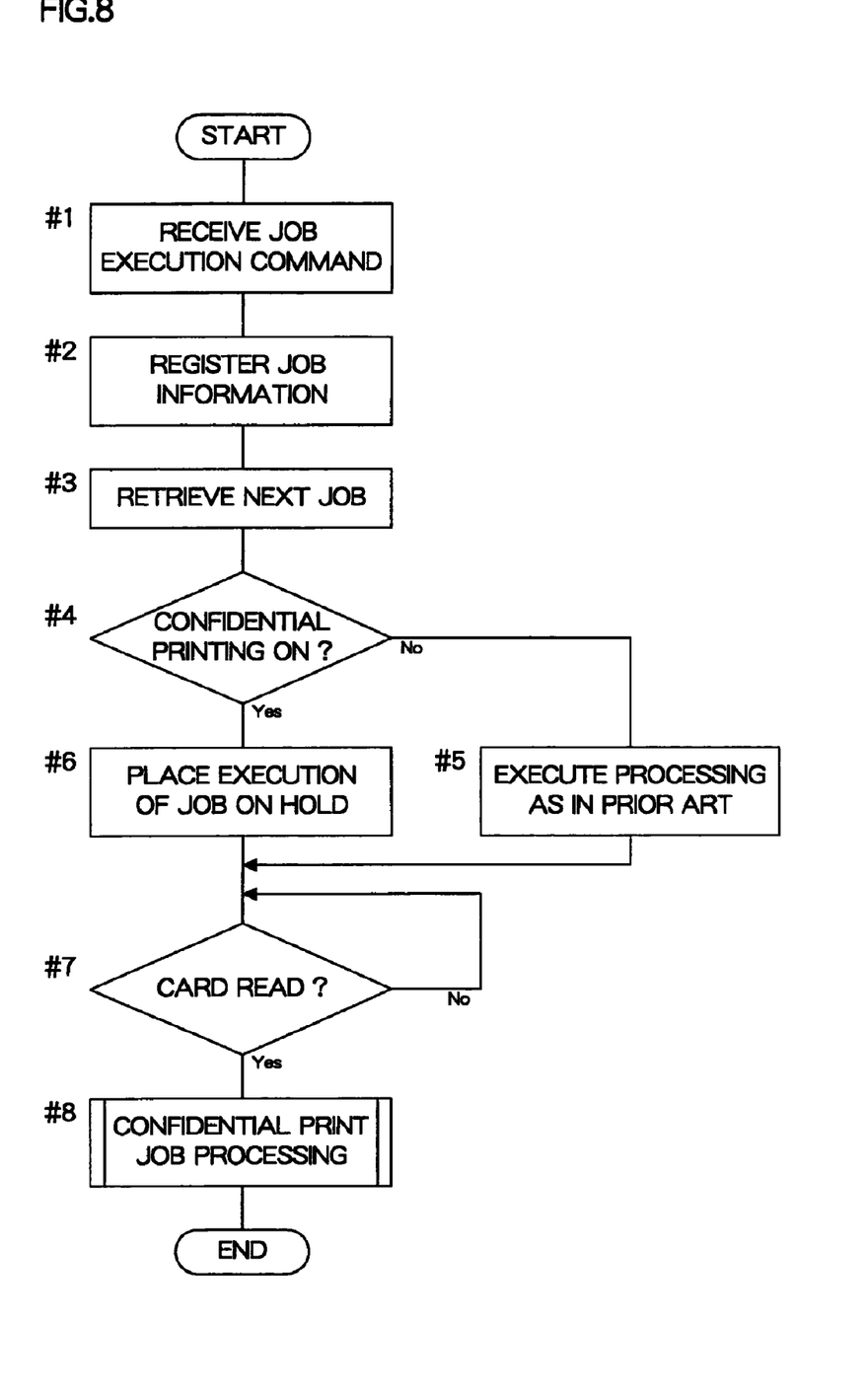
FIG. 8 is a flow chart to explain an example of the sequence of operations of the overall processing performed by the image forming apparatus.
Figure 9:
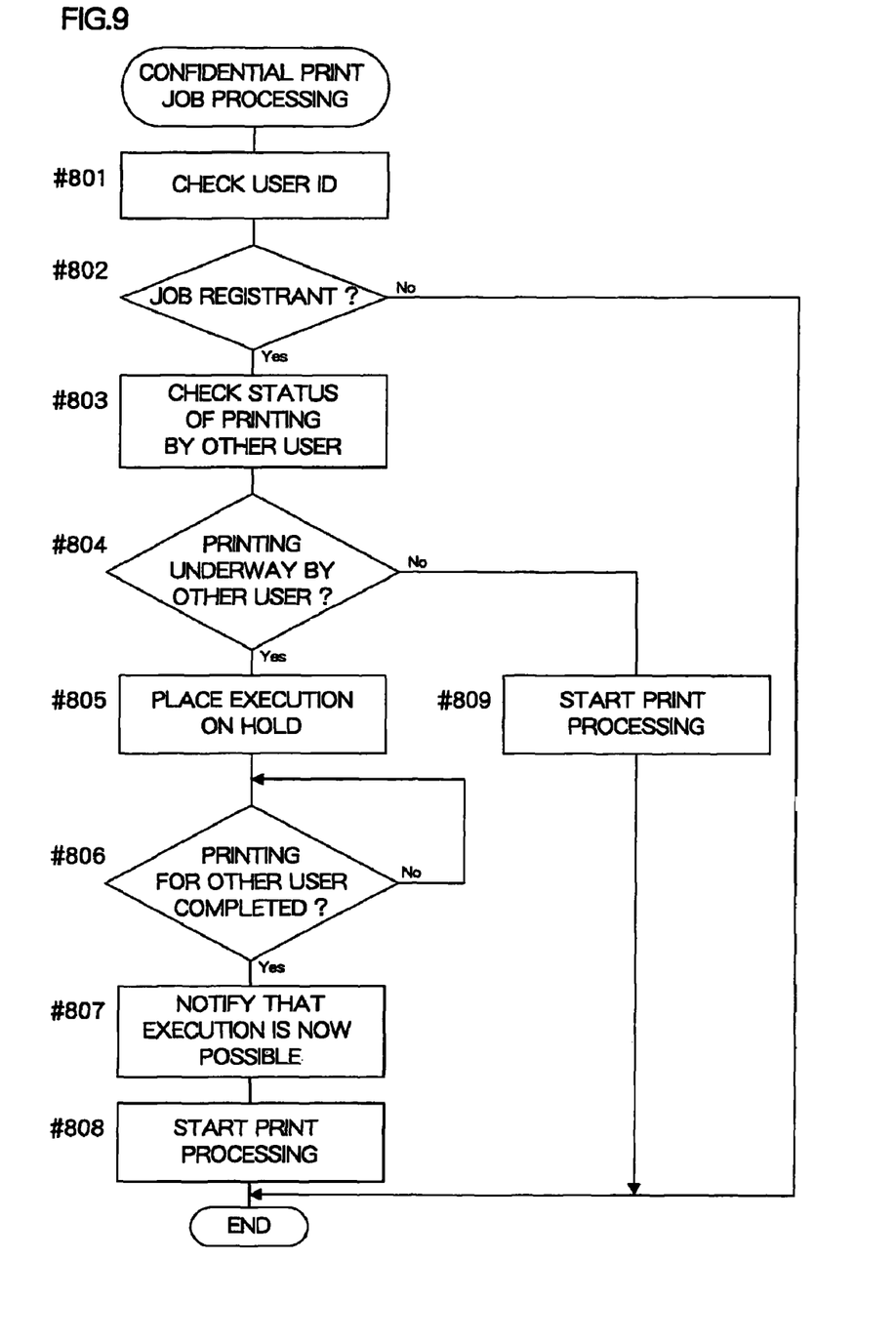
FIG. 9 is a flow chart to explain an example of the sequence of operations performed during confidentiality print job processing.

FIG. 8 is a flow chart to explain an example of the sequence of operations executed during overall processing by the image forming apparatus 1. FIG. 9 is a flow chart to explain an example of the sequence of operations performed during confidential print job processing. The control for the processing shown in each flow chart of FIG. 8 and FIG. 9 is carried out by the CPU 10a.

A user designates the type and processing parameter values for a job to be executed by the image forming apparatus 1 by operating the operation panel 10f or a terminal device 2. When designating a print job (i.e., a PC print job, copy job or box print job) and desiring confidential printing, the user adds that information via the parameter value designation.

Referring to FIG. 8, the image forming apparatus 1 receives the job type and parameter values designated by the user (#1), generates a job information set DT2 that indicates the designated contents and registers the job information set DT2 in the job information table TB2 (see FIG. 7). The operations of steps #1 and #2 are carried out each time a user designates a job type and processing parameter values.

In parallel with steps #1 and #2, the image forming apparatus 1 sequentially executes the jobs indicated by the job information sets DT2 stored in the job information table TB2. In other words, it retrieves job information set DT2 from the job information table TB2 as appropriate depending on the operating status of the hardware resources of the image forming apparatus 1 itself (#3). Where 'Confidential printing' for the retrieved job information set DT2 is not set to 'ON' (NO in #4), the image forming apparatus 1 completes the execution of the job based on the job information set DT2 in the same manner as in the conventional art (#5).

However, if the current date and time is earlier than the date and time of execution commencement for the job, the execution of the job is put on hold and a [different] job is executed based on the next job information set DT2. As described above, after the job information set DT2 for a job is registered in the job information table TB2 in step #2, some operations of that job may be first executed depending on the operating status of the hardware resources. For example, if a copy job is received in step #1, scan processing operations may be executed in advance to obtain output data necessary to execute the operations of the print processing. The same is true for step #8 explained below.

On the other hand, if 'Confidential printing' for the retrieved job information set DT2 is set to 'ON' (YES in #4), the job for that job information set DT2 is put on hold for the time being. When the user who issued the execution command for that job comes to the image forming apparatus 1 and has his user card 5 read by placing it close to the IC card reader/writer 1RW (YES in #7), the job is executed in the sequence shown in the flow chart of FIG. 9 (#8). Print jobs for which confidential printing is designated as a parameter value may be referred to as 'confidential print jobs' herein.

The image forming apparatus 1 checks the user ID read by the IC card reader/writer 1RW against the user IDs of users who issued a command for a print job for which confidential printing is 'ON' (i.e., a confidential print job) and the execution of which is on hold (#801).

If, as a result of the check, the read user ID does not match any of the user IDs of users who issued an execution command for a confidential print job stored in the job information table TB2 (NO in #802), the user who came to the image forming apparatus 1 is determined to be not one of these users associated with the confidential print jobs. Accordingly, the confidential printing job processing is ended. The execution of these confidential print jobs is kept on hold, and the image forming apparatus 1 waits for a new user ID to be read by the IC card reader/writer 1RW once more.

On the other hand, where the read user ID matches the user ID of a user associated with one or more confidential print jobs on hold (YES in #802), the image forming apparatus 1 determines whether or not any of the users other than the user who had his user ID read by the IC card reader/writer 1RW, i.e., a different user, is having print processing executed via the operation of the operation panel 10f (#803).

Whether or not print processing is underway can be determined based on the login status of the image forming apparatus 1 and the operating status of the printing unit 10h. In other words, when a different user who is locally logged into the image forming apparatus 1 exists and the printing unit 10h is operating in order to execute this other user's job, it should be determined that the other user is having print processing executed.

Where another user is having print processing executed (YES in #804), if the confidential print job for the user who had his user ID read by the IC card reader/writer 1RW (i.e., the user who designated confidential printing) is executed immediately following such processing, there is a risk that the other user also would see the printed matter generated based on the confidential print job. Therefore, the execution of the confidential print job for this user is put on hold once more (#805).

When the execution of print processing for the other user has been completed (YES in #806), a message indicating that the execution of print processing for the other user has been completed and that the execution of the confidential printing job for the user will be begun is sent as e-mail to the user's e-mail address (#807). In tandem with or shortly after the e-mail transmission processing, execution of print processing for the user's confidential print job, which has been put on hold, is begun (#808).

It is also acceptable if the print processing in step #808 is skipped after the completion of the execution of print processing for the other user (YES in #806) and only the e-mail transmission processing of step #807 is executed. In this case, the user desiring reopening of the confidential print job on hold has his user ID read by placing his user card 5 close to the IC card reader/writer 1RW once more. The image forming apparatus 1 then executes the operations beginning with step #7 in FIG. 8 once more. This construction can reliably prevent any leak of confidential information. Alternatively, when the print processing of step #808 is skipped, acceptance of print jobs from the operation panel 10f may be temporarily denied until the user ID of the user who issued the command for the confidential print job currently on hold is read after the completion of the execution of print processing for the other user.

Where it is determined in step #803 that the other user is not having print processing executed (NO in #804), however, the execution of print processing of the confidential print job on hold for the user who had his user ID read by the IC card reader/writer 1RW is begun (#809).

The flow chart of FIG. 8 shows the sequence of operations executed when one job is processed. Where a plurality of jobs are handled at the same time, the operations of steps #1 and #2, the operations of steps #3-#6 and the operations of steps #7 and #8 are respectively executed repeatedly as needed. Parallel to these operations, the processing for logging a user into and out of the image forming apparatus 1 is executed where appropriate as well.

Using this embodiment, a printed matter that includes confidential information that the creator does not wish others to see is not output during the period of time that a user other than the creator or user who issued the print command for such confidential printed matter is causing print processing to occur via the operation of the operation panel 10f. When the print processing by this different user is completed, the output of the printed matter including confidential information is begun. Therefore, in comparison with the conventional art, documents generated according to a print command can be more reliably kept confidential from persons other than the person who issued the printing command.

For example, if a user designates the confidential printing option as a processing parameter value when issuing a command for a PC print job from a terminal device 2, even if he does not hurry to the image forming apparatus 1 following the issuance of such command, he can obtain the printed document without it being exposed to others. In addition, when copying or box printing is performed using the timer, a user can obtain the printed matter without it being exposed to others even if he cannot arrive at the image forming apparatus 1 at the designated date and time of output commencement.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

For example, in the embodiment described above, the execution of print processing for a confidential print job is begun when two conditions are met, i.e., (1) the user ID of the user who issued the execution command for the confidential print job has been read by the IC card reader/writer 1RW, and (2) another user is not having print processing executed by the printing unit via the operation of the operation panel 10f when the user ID is read. However, it is also acceptable if different conditions are used for the commencement of execution of print processing for a confidential print job based on the use environment of the image forming apparatus 1 or the security policies in effect. For example, it is acceptable if the above condition (2) is changed to a condition requiring that another user not be operating the operation panel 10f at the time that the user ID is read, or that the printing unit 10h not is executing print processing based on any other person's command. Alternatively, it is also acceptable that the conditions require that (1) no other user be operating the operation panel 10f at the time that the user ID is read, and (2) the printing unit 10h not be executing print processing based on any other person's command.

In the embodiment described above, an IC card was used as the user card 5, but a card read using a different method may be used instead. For example, a magnetic card or a card on which a bar code is printed may be used. However, in these cases, a magnetic card reader or bar code reader is used in place of the IC card reader/writer 1RW.

The user card 5 does not need to be in the form of a business card. For example, a cell phone terminal equipped with an IC tag function may be used as the user card 5.

A construction may be adopted in which, after a prescribed period of time has elapsed following receipt of a confidential print job by the image forming apparatus 1 and registration thereof in the job information table TB2, if the user ID of the user who issued the command for that confidential print job is not read by the IC card reader/writer 1RW and thus user authentication is not performed, the confidential print job is cancelled and print processing is discontinued. By combining this construction and the timer reservation function, the document subjected to confidential printing can be selected in accordance with the time window within which user authentication is carried out.

Alternatively, it is also acceptable if, when one user issues commands for a plurality of confidential print jobs, these confidential print jobs are prioritized such that each time the user ID of the user who issued the commands is read by the IC card reader/writer 1RW, processing is sequentially begun starting with the confidential print job having the first priority, followed by processing for the confidential print job having the second priority and so forth.

In addition, the configuration of the entire image forming apparatus 1 or of the component parts thereof, the contents of processing, the order of processing and the contents of the tables may be appropriately changed within the scope of the present invention.

What is claimed is:

1. A printing apparatus comprising:
   a printing unit that prints an image;
   an operation unit that enables user operation;
   a communication unit that enables communication with a terminal device;
   a receiving unit that receives a command to execute print processing issued by at least a first user to said printing apparatus by operating said operation unit or said terminal device;
   an obtaining unit that obtains via a reading device user identification information based on which at least the first user is identified, wherein said reading device is connected to the printing apparatus and reads the user identification information from a portable recording medium;
   a notification unit that transmits a notification to a user address of at least the first user; and
   a controller that, where said receiving unit receives a confidential print command comprising a command for execution of print processing in a manner that will keep a printed matter confidential from other persons, where user identification information for the first user who issued said confidential print command is read by said reading device, when no print processing based on a command issued by a second user other than the first user who issued said confidential print command via the operation of said operation unit is being executed by said printing unit, executes the print processing pertaining to said confidential print command, and when print processing based on a command issued by the second user is being executed by said printing unit, controls said printing unit such that the execution of the print processing pertaining to said confidential print command is put on hold, and when the print processing based on a command issued by the second user is completed, controls said printing unit such that the execution of the print processing pertaining to said confidential print command is begun,
   wherein following completion of the print processing pertaining to said command issued by said second user via the operation of said operation unit, and before execution of the print processing pertaining to said confidential print command issued by the first user, the notification unit transmits the notification to the user address of the first user who issued said confidential print command for the print processing put on hold, the notification indicating that it is possible to begin said print processing put on hold.

2. The printing apparatus according to claim 1, wherein where said user identification information for the first user who issued said confidential print command is not read by said reading device after a prescribed period of time has elapsed following the issuance of said confidential printing command, said controller cancels the print processing pertaining to said confidential printing command.

3. The printing apparatus according to claim 1, wherein the notification unit transmits the notification in response to completion of the print processing pertaining to said command issued by said second user via the operation of said operation unit, and before execution of the print processing pertaining to said confidential print command issued by the first user.

4. A printing method for use in a printing apparatus having a printing unit, an operation unit enabling user operation, a notification unit that transmits a notification to a user address of at least a first user, and a communication unit enabling communication with a terminal device and to which is connected a reading device that reads from a portable recording medium user identification information by which to identify at least the first user, said printing method comprising the steps of:

1) receiving a command for execution of print processing that is issued by at least the first user to said printing apparatus by operating said operation unit or said terminal device;

2) where a confidential printing command, which comprises a command that print processing should be executed in such a manner that a printed matter is kept confidential from other persons, is received as said command, putting the execution of the print processing for said confidential print command on hold until the user identification information for the first user who issued said confidential print command is read by said reading device; and 3) controlling said printing unit such that, where the user identification information for the first user who issued said confidential print command is read by said reading device, when no print processing for a different command issued via the operation of said operation unit by a second user other than the user who issued said confidential print command is being executed by said printing unit, the print processing pertaining to said confidential print command is executed, and when print processing for a different command issued via the operation of said operation unit by the second user is being executed by said printing unit, the execution of the print processing for said confidential print command put on hold is kept on hold, and when the print processing for a different command issued via the operation of said operation unit by the second user is completed, the execution of the print processing for said confidential print command issued by the first user and put on hold is begun, wherein, following completion of the print processing pertaining to said command issued by said second user via the operation of said operation unit, and before execution of the print processing for said confidential print command issued by the first user, the notification is transmitted by the notification unit to the user address of the first user who issued said confidential print command for the print processing put on hold, the notification indicating that it is possible to begin said print processing put on hold.

5. The printing method according to claim 4, wherein in said step 2, where said user identification information for the first user who issued said confidential print command is not read by said reading device after a prescribed period of time has elapsed following the issuance of said confidential printing command, the print processing pertaining to said confidential printing command is canceled.

6. The printing method according to claim 4, wherein the notification is transmitted by the notification unit in response to completion of the print processing pertaining to said command issued by said second user via the operation of said operation unit, and before execution of the print processing for said confidential print command issued by the first user.

7. A non-transitory computer-readable recording medium storing therein a computer program that is used to control a printing apparatus that includes a printing unit, an operation unit enabling user operation, a notification unit that transmits a notification to a user address of at least a first user, and a communication unit enabling communication with a terminal device, and to which is connected a reading device that reads from a portable recording medium user identification information by which to identify at least the first user, said computer program causing said printing apparatus to execute processing comprising the steps of:

1) receiving a command for execution of print processing that is issued by at least the first user to said printing apparatus by operating said operation unit or said terminal device;

2) where a confidential printing command, which comprises a command that print processing should be executed in such a manner that a printed matter is kept confidential from other persons, is received as said command, putting the execution of the print processing for said confidential print command on hold until the user identification information for the first user who issued said confidential print command is read by said reading device; and 3) controlling said printing unit such that, where the user identification information for the first user who issued said confidential print command is read by said reading device, when no print processing for a different command issued via the operation of said operation unit by a second user other than the user who issued said confidential print command is being executed by said printing unit, the print processing pertaining to said confidential print command is executed, and when print processing for a different command issued via the operation of said operation unit by the second user is being executed by said printing unit, the execution of the print processing for said confidential print command issued by the first user and put on hold is kept on hold, and when the print processing for a different command issued via the operation of said operation unit by the second user is completed, the execution of the print processing for said confidential print command issued by the first user and put on hold is begun, wherein, following completion of the print processing pertaining to said command issued by said second user via the operation of said operation unit, and before execution of the print processing for said confidential print command issued by the first user, the notification is transmitted by the notification unit to the user address of the first user who issued said confidential print command for the print processing put on hold, the notification indicating that it is possible to begin said print processing put on hold.

8. The non-transitory computer-readable recording medium according to claim 7, wherein in said step 2, where said user identification information for the first user who issued said confidential print command is not read by said reading device after a prescribed period of time has elapsed following the issuance of said confidential printing command, the print processing pertaining to said confidential printing command is canceled.

9. The non-transitory computer-readable recording medium according to claim 7, wherein the notification is transmitted by the notification unit in response to completion of the print processing pertaining to said command issued by said second user via the operation of said operation unit, and before execution of the print processing for said confidential print command issued by the first user.

10. A printing apparatus comprising:
a printing unit that prints an image;
an operation unit that enables user operation;
a communication unit that enables communication with a terminal device;
a receiving unit that receives a command to execute print processing issued by at least a first user to said printing apparatus by operating said operation unit or said terminal device;
an obtaining unit that obtains via a reading device user identification information based on which at least the first user is identified, wherein said reading device is connected to the printing apparatus and reads the user identification information from a portable recording medium; and
a controller that, where said receiving unit receives a confidential print command comprising a command for execution of print processing in a manner that will keep a printed matter confidential from other persons, where user identification information for the first user who issued said confidential print command is read by said reading device, when no print processing based on a command issued by a second user other than the first user who issued said confidential print command via the operation of said operation unit is being executed by said printing unit, executes the print processing pertaining to said confidential print command, and when print processing based on a command issued by the second user is being executed by said printing unit, controls said printing unit such that the execution of the print processing pertaining to said confidential print command is put on hold, and when the print processing based on a command issued by the second user is completed, controls said printing unit such that the execution of the print processing pertaining to said confidential print command is begun, wherein following completion of the print processing pertaining to said command issued by said second user via the operation of said operation unit, and before execution of the print processing pertaining to said confidential print command issued by the first user, the receiving unit temporarily denies reception of a new command to execute print processing from the operation unit until user identification information of the first user who issued said confidential print command is obtained via the reading device.

11. A printing method for use in a printing apparatus having a printing unit, an operation unit enabling user operation and a communication unit enabling communication with a terminal device and to which is connected a reading device that reads from a portable recording medium user identification information by which to identify at least a first user, said printing method comprising the steps of:

1) receiving a command for execution of print processing that is issued by at least the first user to said printing apparatus by operating said operation unit or said terminal device;

2) where a confidential printing command, which comprises a command that print processing should be executed in such a manner that a printed matter is kept confidential from other persons, is received as said command, putting the execution of the print processing for said confidential print command on hold until the user identification information for the first user who issued said confidential print command is read by said reading device; and 3) controlling said printing unit such that, where the user identification information for the first user who issued said confidential print command is read by said reading device, when no print processing for a different command issued via the operation of said operation unit by a second user other than the first user who issued said confidential print command is being executed by said printing unit, the print processing pertaining to said confidential print command is executed, and when print processing for a different command issued via the operation of said operation unit by the second user is being executed by said printing unit, the execution of the print processing for said confidential print command put on hold is kept on hold, and when the print processing for a different command issued via the operation of said operation unit by the second user is completed, the execution of the print processing for said confidential print command put on hold is begun, wherein following completion of the print processing pertaining to said command issued by said second user via the operation of said operation unit, and before execution of the print processing for said confidential print command issued by the first user, reception of a new command to execute print processing from the operation unit is temporarily denied until user identification information of the first user who issued said confidential print command is obtained via the reading device.

12. A non-transitory computer-readable recording medium storing therein a computer program that is used to control a printing apparatus that includes a printing unit, an operation unit enabling user operation and a communication unit enabling communication with a terminal device, and to which is connected a reading device that reads from a portable recording medium user identification information by which to identify at least a first user, said computer program causing said printing apparatus to execute processing comprising the steps of:

1) receiving a command for execution of print processing that is issued by at least the first user to said printing apparatus by operating said operation unit or said terminal device;

2) where a confidential printing command, which comprises a command that print processing should be executed in such a manner that a printed matter is kept confidential from other persons, is received as said command, putting the execution of the print processing for said confidential print command on hold until the user identification information for the first user who issued said confidential print command is read by said reading device; and 3) controlling said printing unit such that, where the user identification information for the first user who issued said confidential print command is read by said reading device, when no print processing for a different command issued via the operation of said operation unit by a second user other than the first user who issued said confidential print command is being executed by said printing unit, the print processing pertaining to said confidential print command is executed, and when print processing for a different command issued via the operation of said operation unit by the second user is being executed by said printing unit, the execution of the print processing for said confidential print command put on hold is kept on hold, and when the print processing for a different command issued via the operation of said operation unit by the second user is completed, the execution of the print processing for said confidential print command put on hold is begun, wherein following completion of the print processing pertaining to said command issued by said second user via the operation of said operation unit, and before execution of the print processing for said confidential print command issued by the first user, reception of a new command to execute print processing from the operation unit is temporarily denied until user identification information of the first user who issued said confidential print command is obtained via the reading device.

13. A printing apparatus comprising:
a printing unit that prints an image;
an operation unit that enables user operation;
a communication unit that enables communication with a terminal device;
a receiving unit that receives a command to execute print processing issued by at least a first user to said printing apparatus by operating said operation unit or said terminal device;
an obtaining unit that obtains via a reading device user identification information based on which at least the first user is identified, wherein said reading device is connected to the printing apparatus and reads the user identification information from a portable recording medium; and
a controller that, where said receiving unit receives a confidential print command comprising a command for execution of print processing in a manner that will keep a printed matter confidential from other persons, where user identification information for the first user who issued said confidential print command is read by said reading device, when no print processing based on a command issued by a second user other than the first user who issued said confidential print command via the operation of said operation unit is being executed by said printing unit, executes the print processing pertaining to said confidential print command, and when print processing based on a command issued by the second user is being executed by said printing unit, controls said printing unit such that the execution of the print processing pertaining to said confidential print command is put on hold, and when the print processing based on a command issued by the second user is completed, controls said printing unit such that the execution of the print processing pertaining to said confidential print command is begun, if the obtaining unit obtains via the reading device user identification information of the first user who issued said confidential print command once more.

14. A printing method for use in a printing apparatus having a printing unit, an operation unit enabling user operation and a communication unit enabling communication with a terminal device and to which is connected a reading device that reads from a portable recording medium user identification information by which to identify at least a first user, said printing method comprising the steps of:

1) receiving a command for execution of print processing that is issued by at least the first user to said printing apparatus by operating said operation unit or said terminal device;

2) where a confidential printing command, which comprises a command that print processing should be executed in such a manner that a printed matter is kept confidential from other persons, is received as said command, putting the execution of the print processing for said confidential print command on hold until the user identification information for the first user who issued said confidential print command is read by said reading device; and 3) controlling said printing unit such that, where the user identification information for the first user who issued said confidential print command is read by said reading device, when no print processing for a different command issued via the operation of said operation unit by a second user other than the first user who issued said confidential print command is being executed by said printing unit, the print processing pertaining to said confidential print command is executed, and when print processing for a different command issued via the operation of said operation unit by the second user is being executed by said printing unit, the execution of the print processing for said confidential print command put on hold is kept on hold, and when the print processing for a different command issued via the operation of said operation unit by the second user is completed, the execution of the print processing for said confidential print command put on hold is begun, if the reading device reads user identification information of the first user who issued said confidential print command once more.

15. A non-transitory computer-readable recording medium storing therein a computer program that is used to control a printing apparatus that includes a printing unit, an operation unit enabling user operation and a communication unit enabling communication with a terminal device, and to which is connected a reading device that reads from a portable recording medium user identification information by which to identify at least a first user, said computer program causing said printing apparatus to execute processing comprising the steps of:

1) receiving a command for execution of print processing that is issued by at least the first user to said printing apparatus by operating said operation unit or said terminal device;

2) where a confidential printing command, which comprises a command that print processing should be executed in such a manner that a printed matter is kept confidential from other persons, is received as said command, putting the execution of the print processing for said confidential print command on hold until the user identification information for the first user who issued said confidential print command is read by said reading device; and 3) controlling said printing unit such that, where the user identification information for the first user who issued said confidential print command is read by said reading device, when no print processing for a different command issued via the operation of said operation unit by a second user other than the first user who issued said confidential print command is being executed by said printing unit, the print processing pertaining to said confidential print command is executed, and when print processing for a different command issued via the operation of said operation unit by the second user is being executed by said printing unit, the execution of the print processing for said confidential print command put on hold is kept on hold, and when the print processing for a different command issued via the operation of said operation unit by the second user is completed, the execution of the print processing for said confidential print command put on hold is begun, if the reading device reads user identification information of the first user who issued said confidential print command once more.

* * * * *